United States Patent [19]

Ivie

[11] 4,166,959
[45] Sep. 4, 1979

[54] MULTI-CHANNEL ROTATING OPTICAL INTERFACE FOR DATA TRANSMISSION

[75] Inventor: Charles V. Ivie, Hesperia, Calif.

[73] Assignee: The United States of America as represented by the Administrator of the National Aeronautics & Space Administration, Washington, D.C.

[21] Appl. No.: 827,464

[22] Filed: Aug. 25, 1977

[51] Int. Cl.² ............................................. G02B 27/00
[52] U.S. Cl. ..................................... 250/551; 250/216
[58] Field of Search ............... 250/551, 199, 227, 216; 350/22, 23; 357/19

[56] References Cited

U.S. PATENT DOCUMENTS

| | | | |
|---|---|---|---|
| 3,428,812 | 2/1969 | Burke | 250/203 R |
| 3,752,992 | 8/1973 | Fluhr | 250/199 |
| 4,055,058 | 10/1977 | Tewsley et al. | 250/551 |

Primary Examiner—David C. Nelms
Attorney, Agent, or Firm—Monte F. Mott; John R. Manning; Paul F. McCaul

[57] ABSTRACT

Apparatus for transmitting multiple channels of data across a rotating interface, such as between an antenna that rotates with respect to a platform, including a plurality of light-emitter elements and light detector elements located on the two bodies that rotate relative to each other, a lens for focusing light from each emitter element onto a corresponding detector element, and an image rotating means which is turned as one of the objects rotates, to derotate the images of the emitter elements that are to be focused on the detector elements.

6 Claims, 5 Drawing Figures

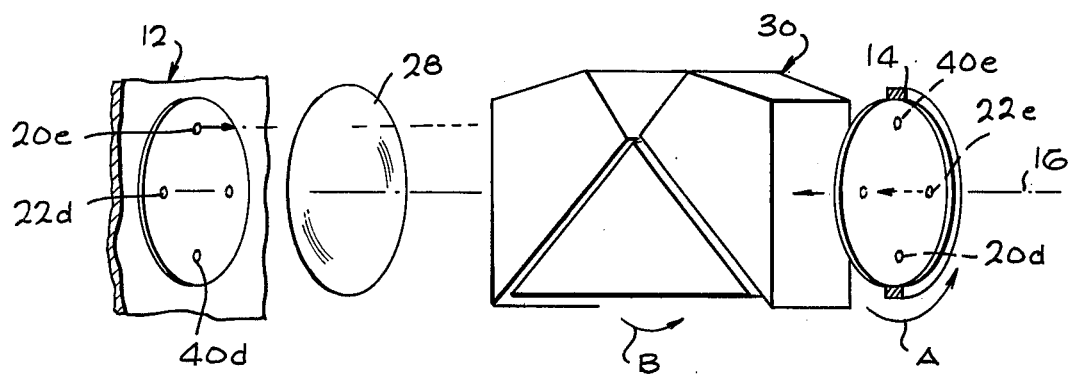
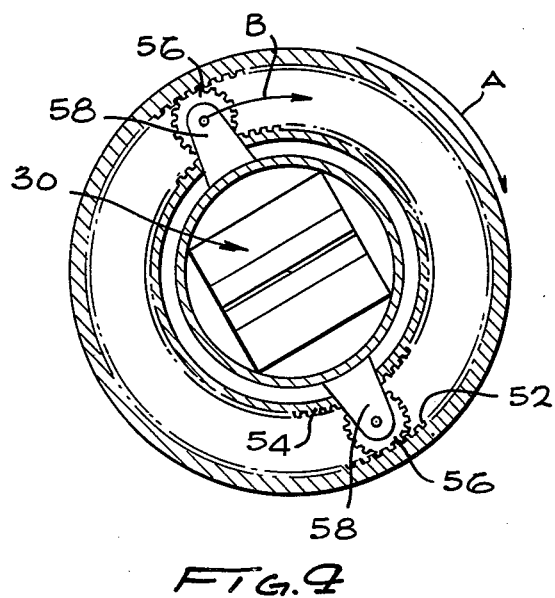
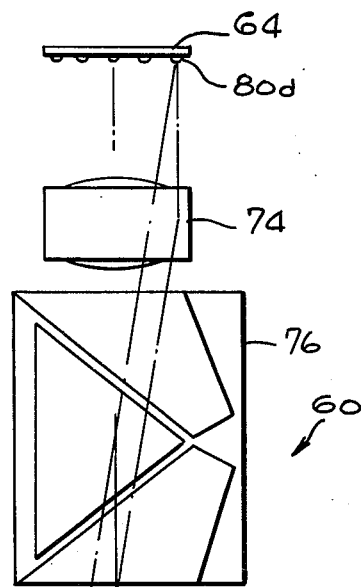
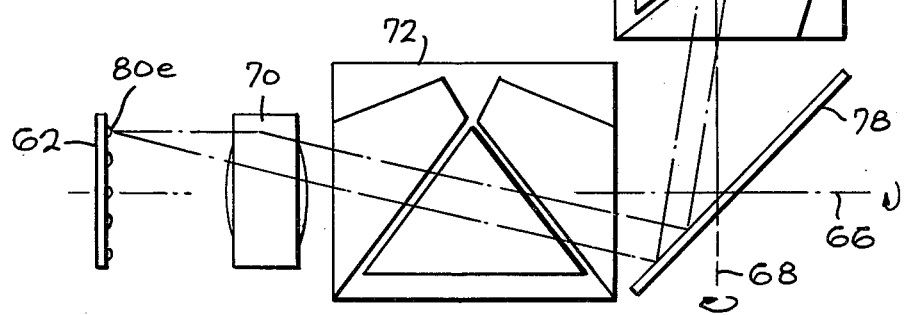

MULTI-CHANNEL ROTATING OPTICAL INTERFACE FOR DATA TRANSMISSION

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to apparatus for transmitting multiple channels of data between bodies that rotate relative to one another.

Sophisticated space vehicles require the transmission of multiple channels of information from the antenna on the vehicle to the earth station. For example, a space vehicle designed to orbit Jupiter is planned to utilize a rotating antenna and instrument platform which may utilize as many as 25 two-way high bit rate channels for carrying information between the antenna platform and the rest of the vehicle. Heretofore, data transfer between such rotating bodies has been effected by the use of slip rings and brushes or by rotating transformers. However, slip rings and brushes have limited trouble-free lifetimes, and rotating transformers are massive and provide limited bandwidth. For contemplated missions to be conducted over periods on the order of five to ten years, more reliable means are required for transmitting multiple channels of data across the rotating interface between the antenna platform and the body of the space vehicle.

SUMMARY OF THE INVENTION

In accordance with one embodiment of the present invention, apparatus is provided for transmitting data over multiple separate channels between bodies that rotate relative to one another, which has a long lifetime. The apparatus includes a plurality of pairs of light elements, each including a light emitter element for emitting modulated light representing data and a light detector element for detecting the modulated light, and with the elements disposed on the different bodies at positions spaced about the axis of rotation of the bodies. A lens is positioned along the axis to focus light from each emitter element onto the corresponding detector element. An image rotating means is also disposed along the axis between the pairs of elements to derotate the image of the patterns of elements so that light from each emitter element is focused on a corresponding detector element regardless of the degree of relative rotation of the bodies.

In one system, a dove prism assembly is utilized which is rotated by half the angle of rotation of one body on the other. The dove prism assembly is mounted on a frame which rotatably carries planetary gears that are engaged with a sun gear fixed to one of the bodies and lying within the orbits of the planetary gears, and are also engaged with a ring gear which is fixed to the other body and which surrounds the planetary gears.

The novel features of the invention are set forth with particularity in the appended claims. The invention will be best understood from the following description when read in conjunction with the accompanying drawings.

BRIEF DESCRIPTION OF THE DRAWINGS

FIG. 2 is a partial perspective view of an apparatus constructed in accordance with the present invention, and which can be utilized in the space vehicle of FIG. 1.

FIG. 4 is a view taken on the line 4—4 of FIG. 3.

FIG. 5 is a partial side view of an apparatus constructed in accordance with the invention, wherein the bodies rotate about two axes relative to one another.

DESCRIPTION OF THE PREFERRED EMBODIMENT

Figure 1:
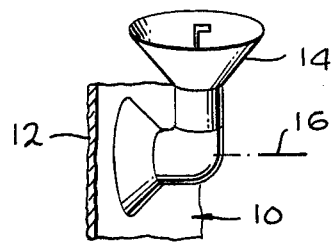
FIG. 1 illustrates a portion of a space vehicle, including an antenna dish which rotates relative to the main body of the vehicle.

FIG. 1 illustrates a portion of a space vehicle 10 which includes a main body 12 and an antenna structure 14 which rotates about an axis 16 with respect to the main body. The antenna structure 14 includes many large capacity electronic circuits which are designed to communicate, over multiple individual channels, with corresponding circuitry on the main body. FIG. 2 illustrates a multi-channel data transmission interface, for transmitting data over multiple channels between the main body 12 and the rotating antenna structure body 14. The main body carries a light emitter element or emitter 20e and a light detector element or detector 22d, that must respectively communicate with a light detector 20d and a light emitter 22e on the rotating body 14.

If the two bodies 12 and 14 were stationary and in the illustrated positions, then a simple lens 28 could be utilized to focus light from each emitter element 20e, 22e onto the corresponding detector element 20d, 22d, because the two patterns of elements on the two bodies are geometrically congruent to one another. That is, the two patterns are the same, except that one may be larger than the other. However, if the body 14 rotates in the direction of arrow A about the axis 16, then the lens cannot focus light from each emitter onto the corresponding detector. To compensate for such rotation of the body 14 and the elements 20d, 22e thereon, an image rotating means 30 is provided to derotate the images. A dove prism assembly can be utilized, which has the property that it rotates an image by twice the angle it is rotated. Thus, for a rotation of the body 14 by an amount indicated by arrow A such as 90°, a dove prism image rotating means 30 is rotated by one-half the angle as indicated by the shorter arrow B. It may be noted that a triple mirror arrangement can be utilized to achieve lighter weight, such a triple mirror arrangement to be rotated by one-half the rotation of the body 14.

Figure 3:
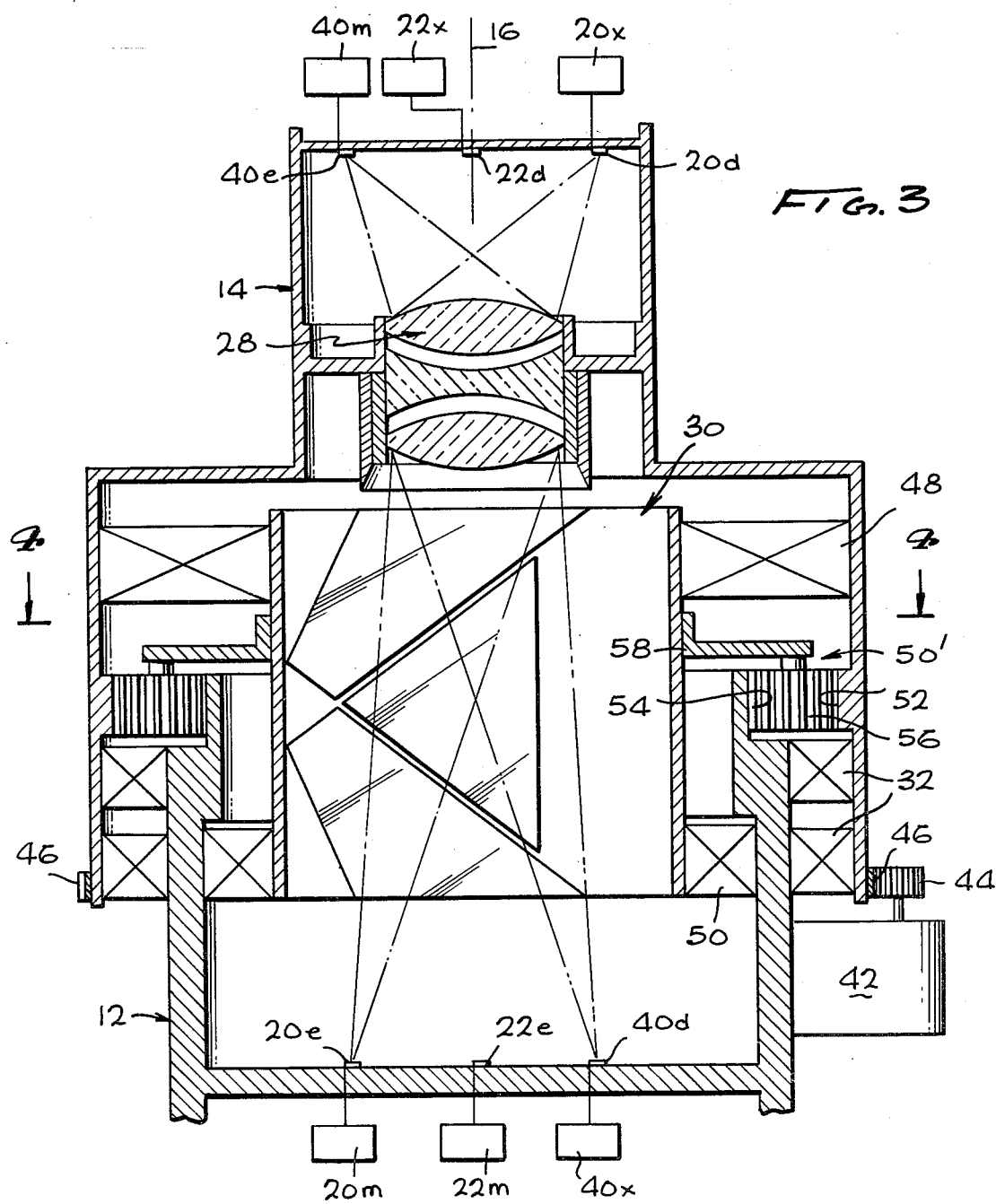
FIG. 3 is a more complete sectional side view of the apparatus of FIG. 2.

FIGS. 3 and 4 illustrate details of a multi-channel data interface of the type illustrated in FIG. 2. The body 14 is rotatably supported by bearings 32 on the other body 12. Light from a pair of emitter elements 20e, 40e on the two bodies are concentrated by the lens 28 onto corresponding detector elements 20d, 40d. The bodies 12, 14 are rotated relative to one another by a motor 42 whose output shaft carries a gear 44 that turns a corresponding gear 46 on the body 14. A dove prism assembly 30 which rotates the images of the light emitter elements, is rotatably mounted by bearings 48, 50 on the two bodies.

The image rotating means which includes the dove prism assembly 30 also includes a transmission 50 that assures that the dove prism assembly will rotate at one-half the angle of the body 14 on the other body 12. The transmission includes a ring gear 52 with internal teeth that is fixed to the body 14, a sun gear 54 with external teeth that is fixed to the other body 12, and a group of planetary gears 56 that are rotatably mounted on a frame 58 that is fixed to the dove prism assembly 30. As shown in FIG. 4, rotation of the ring gear 52 as indicated by arrow A, results in rotation of the dove prism frame 58 and the dove prism assembly 30 therein, in the same direction but by half the angle, as indicated by arrow B. This gearing arrangement automatically rotates the dove prism assembly by the correct amount, and also can easily provide a larger hollow region within the gear transmission mechanism through which light rays travel, in a compact arrangement.

The emitter elements 20e, 22e, 40e, are driven by separate driving or modulator circuits 20m, 22m, 40m, which modulate the current delivered to the light emitters by information signals. The detector elements 20d, 22d, 40d are connected to separate receiver or demoulator circuits 20x, 22x, 40x (which may comprise, for example, a capacitor that allows only the modulated part of the detected signal to pass) that receive, demodulate and amplify the detected signals. The system permits each channel of information to be transmitted over a distinct channel with distinct and separated emitter and detector elements.

In many situations, a body must be able to rotate around two axes with respect to another body. FIG. 5 illustrates a system 60 which permits the transmission of multiple channels of data by electromagnetic radiation such as light waves, between two bodies 62, 64 that rotate relative to each other about two axes 66, 68. The apparatus includes a first lens 70 and first derotator means 72 such as a dove prism assembly, wherein the derotator means or dove prism assembly 72 is rotated by one-half the angle of rotation of the second body 64 about the axis 66 with respect to the first body 62. The mechanism also includes a second lens 74 and second derotating means 76 wherein the derotating means or dove prism assembly 76 rotates about the axis 68 at one-half the angle that the body 64 rotates about the axis 68 with respect to the first body 62. The apparatus further includes a mirror 78 angled at 45° to each axis 66, 68. It can be seen that a light emitter element or emitter 80e emits light which is collimated by the lens 70 and which is derotated by the dove prism assembly 72, before reaching the mirror 78. The light reflected from the mirror passes through the other prism assembly 76 which again derotates it, and then through the lens 74 which focuses the collimated light beams onto a light detector element or detector 80d. The same type of gear transmission mechanism illustrated in FIG. 4 can be utilized for each of the dove prism assemblies 72, 76 to rotate them.

Thus, the invention provides apparatus for transmitting multiple channels of data between two bodies which rotate relative to one another. This is accomplished by utilizing multiple emitters of electromagnetic radiation which herein may be referred to as light waves, and corresponding detectors positioned on the two bodies, together with lens means for concentrating light from the emitters onto the detectors, and image rotating means for derotating the beams of light or other radiation. A dove prism assembly or a three mirror arrangement can be utilized as the derotator which rotates an image by twice the amount that the derotator is turned. A gear transmission apparatus can be used which includes a sun gear fixed to one body, a ring gear fixed to the other body, and planetary gears engaged with the ring and sun gears and mounted on the derotating device to turn it by one-half the angle that the bodies rotate relative to each other. Present day technology permits the operation of small solid state light emitters and detectors at bit rates in excess of 20 million bits per second, which permits large amounts of data to be transmitted along each channel. The use of multiple separate channels enables the transmission of multiple signals by modulating each emitter by the data in that channel, which simplifies the systems, as well as enabling the transmission of more data in a given time period.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for transmitting data between two bodies which rotate relative to one another about at least one predetermined axis, comprising:
    image rotating means disposed along said axis;
    a plurality of pairs of light elements, each pair including a light emitter element and a light detector element disposed beyond opposite ends of said image rotating means, the elements beyond opposite ends of said image rotating means arranged in the same pattern and mounted on different ones of said bodies to rotate therewith about said axis;
    a plurality of emitter drivers each coupled to a corresponding light emitter element for driving it to produce modulated light representing data;
    a plurality of receivers each coupled to a corresponding light detecting element for receiving data signals therefrom; and
    lens means for directing light from each emitter element onto a corresponding detector element;
    said image rotating means being constructed to derotate the image of each pattern of elements on a body, which is formed on the other body, as relative rotation occurs about said axis.

2. The apparatus described in claim 1 wherein said image rotating means includes:
    a ring gear with internal teeth, said ring gear fixed to one of said bodies;
    a sun gear lying within said ring gear and fixed to other of said bodies;
    a planetary gear engaged with the teeth of said ring gear and the teeth of said sun gear; and
    optical means which derotates an image when rotated by half the angle of the imaged subject, said means rotatably supporting said planetary gear.

3. The apparatus described in claim 1 wherein said bodies also rotate relative to each other about a second axis, and including:
    mirror means disposed along said axes, to direct light moving along the first named axis into a direction along the second axis; and
    second image rotating means disposed along said second axis, for derotating the image of each pattern of elements on a body, which is formed on the other body, as relative rotation occurs about said second axis.

4. A multi-channel data transmission system, comprising:
- a base member;
- a second member rotatably mounted on said base member;
- means for rotating said second member with respect to said base member;
- a plurality of separate light emitting elements mounted on a first of said members and arranged in a predetermined first pattern;
- a plurality of separate light receiving elements mounted on a second of said members in a second pattern which is congruent to said first pattern;
- a focusing lens means disposed between said patterns of elements for focusing light from each of said emitter elements onto a corresponding detector element;
- dove prism means disposed between said members along the axis of said lens, for derotating the image formed by said lens when said prism means is turned by one-half the relative angle of rotation of said members; and
- means for rotating said dove prism means at one-half the relative angle of rotation of said members.

5. The system described in claim 4 wherein said means for rotating said dove prism means includes:
- a ring gear with internal teeth, said ring gear fixed to one of said members;
- a sun gear lying within said ring gear and fixed to other of said members;
- a planetary gear engaged with the teeth of said ring gear and the teeth of said sun gear; and
- means rotatably mounting said planetary gear on said dove prism means so that the axis of rotation of said planetary gear is fixed with resepct to said dove prism means, whereby to cause rotation of said dove prism means by one-half the relative rotation of said members with respect to each other.

6. A method for transmitting a plurality of channels of data between two bodies that rotate relative to one another, comprising:
- delivering current to each of a plurality of separate light emitters located on a first of said bodies;
- modulating the current delivered to each emitter by a separate channel of data;
- focusing light from each of said emitters onto the plane of a plurality of corresponding separate light detectors; and
- rotating the light patterns transmitted between said bodies, to focus light from each emitter onto a corresponding detector while the bodies rotate.

* * * * *